United States Patent [19]
Kim

[11] Patent Number: 5,751,726
[45] Date of Patent: May 12, 1998

[54] REPRESENTATIVE VALUE SELECTOR AND AN EMBODYING METHOD THEREFOR

[75] Inventor: You Taeq Kim, Seoul, Rep. of Korea

[73] Assignee: Hyundai Electronics Industries, Co. Ltd., Kyoungki, Rep. of Korea

[21] Appl. No.: 513,060

[22] Filed: Aug. 9, 1995

[30] Foreign Application Priority Data

Dec. 31, 1994 [KR] Rep. of Korea ............ 94-40426

[51] Int. Cl.$^6$ ............................................. G06F 11/00
[52] U.S. Cl. ............................................. 371/6; 371/36
[58] Field of Search ............ 395/182.04, 185.01, 395/185.02, 185.03, 185.04, 185.05, 185.06, 185.07, 875; 371/2.1, 6, 30, 36, 37.9, 67.1, 68.1, 68.2, 69.1

[56] References Cited

U.S. PATENT DOCUMENTS

| | | | |
|---|---|---|---|
| 4,839,855 | 6/1989 | Van Driel | 364/900 |
| 4,995,040 | 2/1991 | Best et al. | 371/36 |
| 5,339,404 | 8/1994 | Vandling, III | 395/575 |
| 5,469,447 | 11/1995 | Brunemann, Jr. et al. | 371/36 |

*Primary Examiner*—Dennis M. Butler
*Attorney, Agent, or Firm*—Saliwanchik, Lloyd & Saliwanchik

[57] ABSTRACT

Disclosed is an operating device which includes an algorithm for selecting one representative value among various calculated results based on diverse interpretations with respect to identical events or same information, and a method for selecting the representative value among several values, in which a separate circuit is not constructed for calculating input data values, but a program is inherently incorporated into an existing operational device for selecting the input data values, thereby avoiding an unnecessary circuit construction while a method for searching out most frequently distributed data values is introduced by processing data values included in a certain error range as the same value to solve a problem in the Triple Modular Redundance system, and reduce cost required for constructing the circuitry.

6 Claims, 2 Drawing Sheets

REPRESENTATIVE VALUE SELECTOR AND AN EMBODYING METHOD THEREFOR

BACKGROUND OF THE INVENTION

1. Field of the Invention

The present invention relates to an operating apparatus for selecting a representative value among several values and an embodying method therefor, and more particularly to an operating apparatus internally having an algorithm such as a Triple Modular Redundance (TMR) system for selecting one representative value in the result of various calculations based on diverse interpretation with respect to the same event or identical information, and a method for embodying the same.

2. Description of the Prior Art

As shown in FIG. 1, a conventional 1-bit selector among selectors for selecting a representative value includes a first AND gate A for receiving a data value from an unshown sensor or oscillator in the bit unit via first and second input terminals, a second AND gate B for receiving the data value in the bit unit via second and third input terminals, and a third AND gate C for receiving the data value in the bit unit via third and first input terminals. In addition, an OR gate 10 receives and operates on data values from the respective output terminals of the AND gates A, B and C, thereby outputting the result.

In the 1-bit selector constructed as above, the data input terminals can receive the inputs only in the bit unit. Moreover, in order to expand to a plurality of bits, a plurality of AND gates and OR gates must be combined as required.

The representative value selector formed by combining the AND gates with the OR gate involves a problem of possibly containing a difference between transmission signals per bits. To overcome the different transmitting points between respective bits, a multiple-bit representative value selector may be formed by using flip-flops.

Furthermore, the above-stated representative value selector has heretofore been applicable only when the result of calculation is obtained by several representative values because the selector is required for selecting the representative value. In other words, if the representative value is diverse, numerous selectors are needed for selecting the diverse representative values. Therefore, a circuit incorporated with a lot of circuits is necessarily constructed to limit the embodiment thereof.

In more detail, the selector has a fast operating speed of an input data value to select a representative value, and can be used in a system without including a separate operating apparatus. On the contrary, the circuitry thereof is complicated as the number of bits is increased to not only dissipate excessive power but also increase the apparatus in size and weight.

Meantime, the representative value may be selected by using software without constructing the circuit as above. In this case, the speed is slower than the method based on the hardware, and a separate operating apparatus is required, the circuit construction is not needed to complement the issue in the hardware.

However, the methods based on the software and hardware commonly have a problem that measured values with respect to the identical circumstances or objects do not accurately conform to each other, causing an error due to a minute difference of a measuring apparatus, so that the representative value cannot be selected. That is, the input measured values are different from each other to make it impossible to search out the representative value.

As one method for solving the common problem, values within a certain error range are treated as the same value to select plural distribution. To utilize this method on the hardware basis, a filter for processing values included in the certain error range should be designed to inevitably construct an additional circuit.

As another example, U.S. Pat. No. 5,339,404 entitled "Asynchronous TMR Processing System" is known to those of ordinary skill in the art. Here, the asynchronous TMR processing system includes N-numbered processors, N-numbered controllers respectively coupled with the processors, memories respectively coupled with the processors, a bi-directional control bus between the controller and processor coupled thereto, a unidirectional control bus between the other processor and controller of the system, means for supplying element requester to respective processors to compete with one another within the system, and a plurality of voters for providing adjustment service not to select input but output transmission. Respective processors are provided with means to be operated in accordance with inherent clocks, and the voters afford an adjustment selecting service conducted by N to 1 combiners for selecting the output transmission and by 1 to N splitters that do not select input. This technique, accordingly, has a different scope from the present invention, and cannot solve the above-described conventional problems.

BRIEF SUMMARY OF THE INVENTION

The present invention is devised to solve the above-described problems. Accordingly, it is an object of the present invention to provide a representative value selector and embodying method therefor, in which a permissible error range is set to expand an application scope of restriction with respect to the results of identical calculations, and unnecessary circuit construction is eliminated.

To achieve the above object of the present invention, there is provided a representative value selector for selecting one representative value among various calculated results based on diverse interpretations with respect to identical events or same information. The selector includes an input unit for supplying data values by an oscillator, sensor or keyboard, an operational device programmed for selecting the representative value among the data values received from the input unit, an output unit for outputting the representative value operated to be selected in the operational device, and a memory for storing the data values and the result of the operation.

A method for embodying the process of selecting one representative value including the steps of receiving a permissible error and data values from an input unit, obtaining results of absolute values of the differences of respective input data values, sorting the results in ascending order, and when only one result belongs to the permissible error range among the sorted results, the data value corresponding to the second order of the result is output, and when no results belong to the permissible error range, no representative value is output.

BRIEF DESCRIPTION OF THE DRAWINGS

The above objects and other advantages of the present invention will become more apparent by describing in detail preferred embodiments thereof with reference to the attached drawings which.

DETAILED DISCLOSURE OF THE INVENTION

Figure 1:
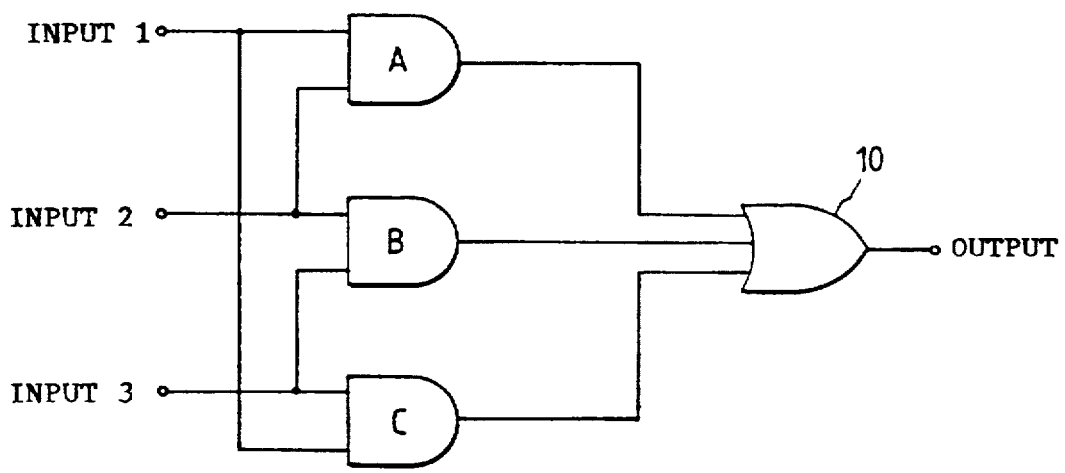
FIG. 1 is a circuit diagram showing a conventional representative value selector.
Figure 2:
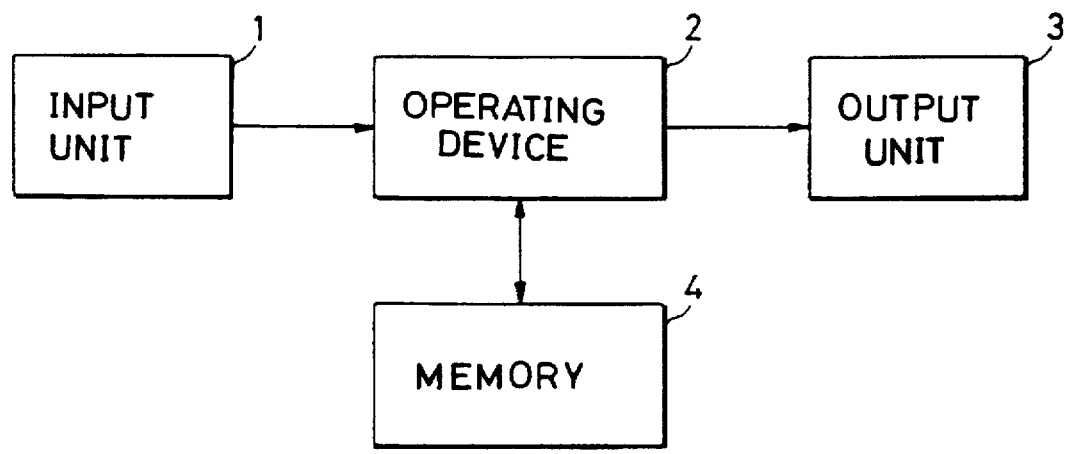
FIG. 2 is a block diagram showing a construction of a representative value selector according the present invention.

Referring to FIG. 2, a representative value selector according to the present invention includes an input unit 1 for supplying data values by means of an unshown oscillator, sensor or keyboard to an operating device 2 programmed to select a representative value among the data values received from the input unit 1, an output unit 3 for outputting the representative value after being selected by the operating device 2, and a memory 4 for storing the data values and the result of the operation.

The operating device 2 of one embodiment receives a permissible error and data values from the input unit 1 to calculate results of absolute values of respective differences of the received data values, sort the results in ascending order, so that the data value included in the second order is obtained to be output by means of the output unit 3 only when one sorted result among the sorted results belongs to the permissible error range. If no results among the sorted results belong to the permissible error range, the representative value is not selected, and nothing is output.

A process for selecting the representative value of one embodiment will be described with reference to FIG. 3.

The permissible error Tn and data values V1, V2 and V3 are received from the input unit (step S1) to obtain absolute values d12, d13, and d23 of respective input data values (step 2). The "1" in $d_{12}$ is in the first subscript position and is hereinafter defined as the first order. The "2" in $d_{12}$ is in the second subscript position and is hereinafter defined as the second order. This terminology shall follow throughout all references to the absolute values in the specifications, drawings, and claims (e.g., the x in $d_{xy}$ is first order, the y in $d_{xy}$ is second order). Then, the results of the calculated values are sorted in ascending order (step S3), so that the data value corresponding to the second order is selected when only one result is smaller than or equals the initially-input permissible error Tn (step S5), thereby outputting the data value (step S6). If no results are greater than the initially-input permissible error Tn, a failure of selecting the representative value is output.

Figure 3:
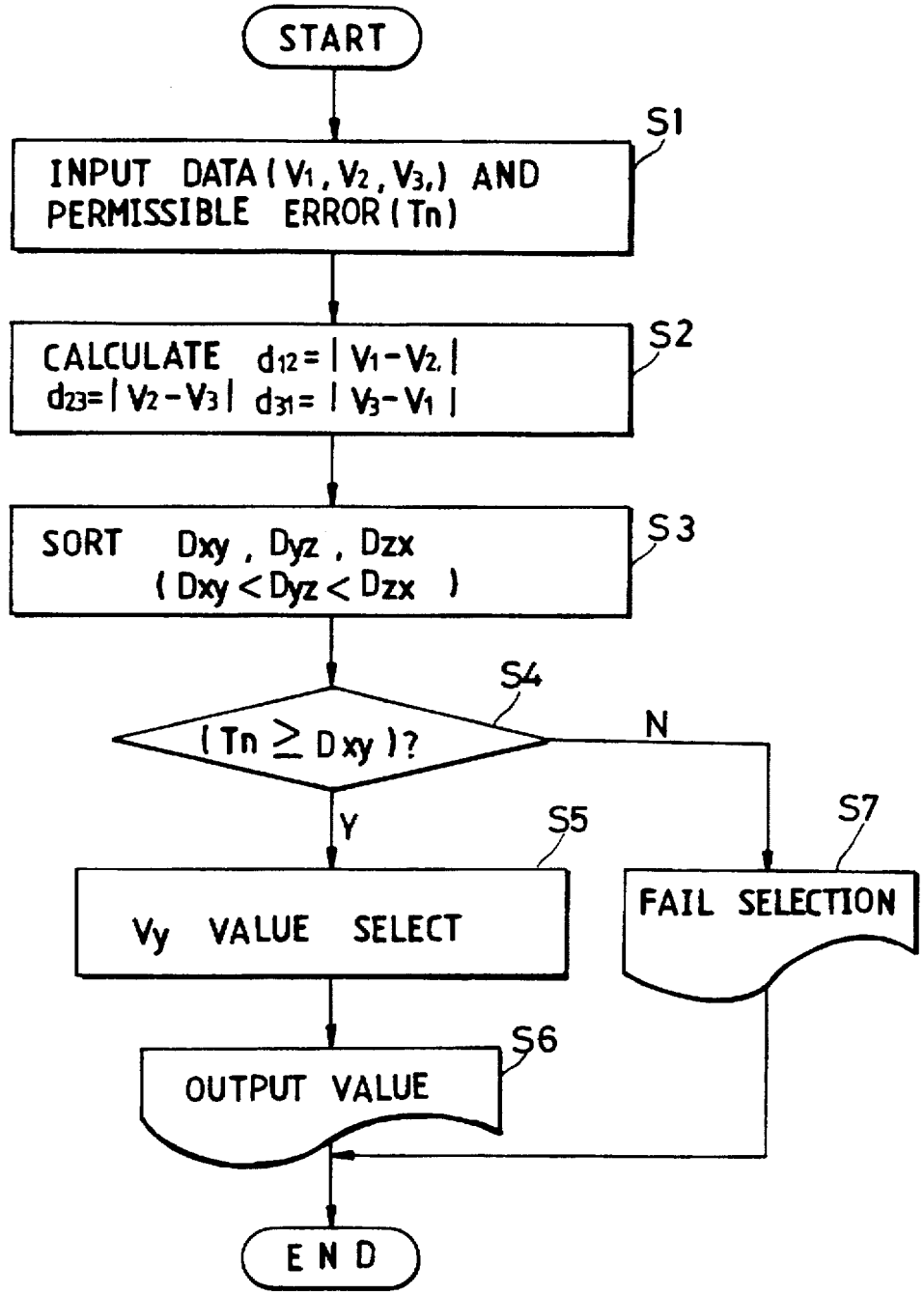
FIG. 3 is a flowchart for illustrating the steps of selecting the representative value according to one embodiment of the present invention.

FIG. 3 illustrates a case in which the input data values are three, but, basically, can be applied regardless of the number of input data values and magnitude of the numerical values. To assist the understanding of this embodiment, the following example is provided.

EXAMPLE #1

In this example, the permissible error Tn is one, and the input data values are given as in the following table:

| $V_1$ | $V_2$ | $V_3$ | $V_4$ |
|---|---|---|---|
| 100 | 102 | 103 | 106 |

The absolute value of the differences between the data values are obtained as:

$d12=|V_1-V_2|=2$,
$d13=|V_1-V_3|=3$,
$d14=|V_1-V_4|=6$,
$d23=|V_2-V_3|=1$,
$d24=|V_2-V_4|=4$, and
$d34=|V_3-V_4|=3$.

The above results are sorted in ascending order as follows:

| $D_1$ | $D_2$ | $D_3$ | $D_4$ | $D_5$ | $D_6$ |
|---|---|---|---|---|---|
| $d_{23}=1$ | $d_{12}=2$ | $d_{13}=3$ | $d_{34}=3$ | $d_{24}=4$ | $d_{14}=6$ |

The only result within the permissible error range is $d_{23}=1$. Therefore, the value corresponding to the second order of the result, $V_3=103$ is output.

In an alternate embodiment of the present invention, the method for embodying the process of selecting one representative value includes the steps of receiving a permissible error and data values from an input unit, obtaining results of the absolute values of the differences of respective input data values, sorting the results in ascending order, and (1) when only one result belongs to the permissible error range among the sorted results, the data value corresponding to the second order of the result is output, (2) when more than one result belongs to the permissible error range among the sorted results, the data value corresponding to the first or second orders of the results in the range which occurs most frequently is output, and (3) when no results belong to the permissible error range, no representative value is output.

To assist the understanding of this process, a case in which the input data values number five will be described as an example of this alternate embodiment.

EXAMPLE #2

Provided that the permissible error Tn is one, and the input data values are given as in the following table:

| V1 | V2 | V3 | V4 | V5 |
|---|---|---|---|---|
| 100 | 101 | 102 | 106 | 107 | the absolute values of the difference between the data values are obtained as:

$d12=|V1-V2|=1$,
$d13=|V1-V3|=2$,
$d14=|V1-V4|=6$,
$d15=|V1-V5|=7$,
$d23=|V2-V3|=1$,
$d24=|V2-V4|=5$,
$d25=|V2-V5|=6$,
$d34=|V3-V4|=4$,
$d35=|V3-V5|=5$, and
$d45=|V4-V5|=1$.

Then, when the above results are sorted in the ascending order to be denoted as Dxy, and values capable of searching out the data values are designated xy, wherein x is the first order and y is the second order, they can be written as in the following table:

| D1 | D2 | D3 | D4 | D5 |
|---|---|---|---|---|
| d12 = 1 | D23 = 1 | d45 = 1 | d13 = 2 | d34 = 4 |
| D6 | D7 | D8 | D9 | D10 |
| d24 = 5 | d35 = 5 | d14 = 6 | d25 = 6 | d15 = 7 |

Here, since the error range Tn is given by one, the results within the permissible error range Tn are d12, d23 and d45 as compared with the sorted results. Accordingly, more than one result belongs to the error range. For the corresponding data values in the first and second orders of these results, V1 is included once, V2 is included twice, V3 is included once, V4 is included once, and V5 is included once. The value of 101, which is the value of V2 most frequently included therein, is selected as the final result.

Therefore, in the representative value selector and embodying method, according to the present invention as described above, a separate circuit is not constructed for calculating input data values, but a program is inherently incorporated into an existing operational device for selecting the input data values, thereby avoiding an unnecessary circuit construction. In addition, to solve a problem in which measured values with respect to identical circumstances or objects do not accurately conform to one another due to a minute difference due to the measuring equipment itself, which causes an error, thereby making it impossible to select a representative value, a method for searching out most frequently distributed data values is introduced by processing data values included in a certain error range as the same value. As a result, the problem in the Triple Modular Redundance system can be solved while reducing the cost required for constructing the circuitry.

While the present invention has been particularly shown and described with reference to particular embodiments thereof, it will be understood by those skilled in the art that various changes in form and details may be effected therein without departing from the spirit and scope of the invention as defined by the appended claims.

I claim:

1. A representative value selector for selecting one representative value among various calculated results based on diverse interpretations with respect to identical events or same information, comprising:

input means for supplying data values by an oscillator, sensor or keyboard;

an operational device programmed for selecting the representative value among said data values received from said input means; wherein said operational device is programmed to receive a permissible error range and said data values from said input means for calculating results of absolute values of differences in said respective input data values, said device further being programmed to sort the results of the calculations in ascending order, and when only one result belongs to said permissible error range among the sorted results, to output the data value corresponding to the second order of the result, and to select no representative value output when no results belong to said permissible error range;

output means for outputting said representative value operated to be selected in said operational device; and a memory for storing said data values and the result of the operation.

2. A representative value selector as claimed in claim 1, wherein when more than one result belongs to said permissible error range among the sorted results, to output the data value corresponding to the first or second order of the results in said range which occurs most frequently.

3. A method for selecting one representative value among various calculated results based on diverse interpretations with respect to identical events or same information, comprising the steps of:

receiving a permissible error and data values from an input unit;

obtaining results of the absolute values of the differences in said respective input data values;

sorting the results in ascending order;

selecting to output the data value included in the second order when only one sorted result is smaller than or equals the initially-input permissible error; and outputting a failure of selecting the representative value when all sorted results are greater than said initially-input permissible error.

4. The method as claimed in claim 3, further comprising prior to the outputting step, the step of selecting the most frequently occurring data value corresponding to the first or second orders selected from the results which fall within said error range only when more than one result belongs to the permissible error range.

5. A representative value selector for selecting one representative value among various calculated results based on diverse interpretations with respect to identical events or same information, comprising:

input means for supplying data values by an oscillator, sensor or keyboard;

an operational device programmed for selecting the representative value among said data values received from said input means; wherein said operational device is programmed to receive a permissible error range and said data values from said input means for calculating results of absolute values of differences in said respective input data values, said device further being programmed to sort the results of the calculations in ascending order, and when only one result belongs to said permissible error range among the sorted results, to output the data value corresponding to the second order of the result, and when more than one result belongs to the permissible error range among the sorted results, to output the data value corresponding to the first or second orders of the results in said range which most frequently occurs, and when no results belong to said permissible error range among the sorted results, to select no representative value to output;

output means for outputting said representative value operated to be selected in said operational device; and a memory for storing said data values and the result of the operation.

6. A method for selecting one representative value among various calculated results based on diverse interpretations with respect to identical events or same information, comprising the steps of:

receiving a permissible error and data values from an input unit;

obtaining results of absolute values of the differences in said respective input data values;

sorting the results in ascending order;

selecting to output the data value included in the second order when only one sorted result is smaller than or equals the initially-input permissible error;

selecting the most frequently occurring data value corresponding to the first or second orders selected from the results which fall within said error range only when more than one result belongs to the permissible error range; and outputting a failure of selecting the representative value when all sorted results are greater than said initially-input permissible error.

* * * * *